US009009689B2

(12) United States Patent
Krishnaiyer et al.

(10) Patent No.: US 9,009,689 B2
(45) Date of Patent: Apr. 14, 2015

(54) SPECULATIVE COMPILATION TO GENERATE ADVICE MESSAGES

(75) Inventors: Rakesh Krishnaiyer, Milpitas, CA (US); Hideki Saito Ido, Sunnyvale, CA (US); Ernesto Su, Campbell, CA (US); John L. Ng, San Jose, CA (US); Jin Lin, San Jose, CA (US); Xinmin Tian, Union City, CA (US); Robert Y. Geva, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 811 days.

(21) Appl. No.: 12/942,543

(22) Filed: Nov. 9, 2010

(65) Prior Publication Data

US 2012/0117552 A1    May 10, 2012

(51) Int. Cl.
*G06F 9/45* (2006.01)
*G06F 11/36* (2006.01)

(52) U.S. Cl.
CPC ............... *G06F 8/4441* (2013.01); *G06F 8/41* (2013.01); *G06F 11/3664* (2013.01)

(58) Field of Classification Search
USPC .......................... 717/140, 146, 150, 151, 159
See application file for complete search history.

(56) References Cited

U.S. PATENT DOCUMENTS

| | | | | |
|---|---|---|---|---|
| 5,966,538 | A * | 10/1999 | Granston et al. ............... | 717/158 |
| 2003/0023961 | A1 * | 1/2003 | Barsness et al. ............... | 717/152 |
| 2003/0066061 | A1 * | 4/2003 | Wu et al. ........................ | 717/158 |
| 2003/0074653 | A1 * | 4/2003 | Ju et al. .......................... | 717/154 |
| 2003/0088864 | A1 * | 5/2003 | Tirumalai et al. .............. | 717/160 |
| 2003/0101444 | A1 | 5/2003 | Wu et al. | |
| 2003/0140334 | A1 * | 7/2003 | Granston et al. .............. | 717/125 |
| 2004/0010782 | A1 * | 1/2004 | Moritz ........................... | 717/151 |
| 2004/0261064 | A1 * | 12/2004 | Goldstein et al. ............. | 717/140 |
| 2005/0144602 | A1 * | 6/2005 | Ngai et al. ..................... | 717/151 |
| 2007/0011684 | A1 * | 1/2007 | Du et al. ........................ | 718/105 |
| 2007/0226698 | A1 * | 9/2007 | Cascaval et al. .............. | 717/127 |
| 2007/0294680 | A1 * | 12/2007 | Papakipos et al. ............ | 717/149 |
| 2009/0144281 | A1 | 6/2009 | Grcevski et al. | |
| 2009/0320008 | A1 * | 12/2009 | Barsness et al. ............... | 717/151 |
| 2010/0115501 | A1 * | 5/2010 | Partridge et al. .............. | 717/148 |
| 2011/0271263 | A1 * | 11/2011 | Archer et al. .................. | 717/149 |
| 2012/0079466 | A1 * | 3/2012 | Gonion ........................... | 717/150 |

OTHER PUBLICATIONS

"PCT Search Report and Written Opinion", PCT/US2011/059701, (May 30, 2012), 1-9.
Taiwan IPO Search Report, dated Mar. 12, 2014, 2 pages.

(Continued)

*Primary Examiner* — Lewis A Bullock, Jr.
*Assistant Examiner* — Tina Huynh
(74) *Attorney, Agent, or Firm* — Blakely, Sokoloff, Taylor & Zafman LLP

(57) ABSTRACT

Methods to improve optimization of compilation are presented. In one embodiment, a method includes identifying one or more optimization speculations with respect to a code region and speculatively performing transformation on an intermediate representation of the code region in accordance with an optimization speculation. The method includes generating an advice message corresponding to the optimization speculation and displaying the advice message if the optimization speculation results in an improved compilation result.

19 Claims, 4 Drawing Sheets

(56) References Cited

OTHER PUBLICATIONS

Tournavitis, et al., "Towards a Holistic Approach to Auto-Parallelization; Integrating Profile-Driven Parallelism Detection and Machine-Learning Based Mapping," PLDI 2009, 11 pages.

Ishihara, et al., "Interactive Parallelizing Assistance Tool for OpenMP: iPat/OMP", Fifth European Workshop on OpenMP, Aachen, Germany, 2003, 9 pages.

Mock, "Introduction to Compiler Consultant," Texas Instruments, Application Report, Apr. 2004, 27 pages.

* cited by examiner

SPECULATIVE COMPILATION TO GENERATE ADVICE MESSAGES

FIELD OF THE INVENTION

Embodiments of the invention relate to the field of code compilation, in particular, to compiler optimization.

BACKGROUND OF THE INVENTION

Development of multi-threaded application remains a challenging task.

A compiler may present a model in which a programmer writes serial code, thus avoiding the complexities of parallel programming. A compiler may be able to transform code to execute in a parallelized and vectorized manner. For example, the compiler extracts the parallel/vector semantics out of the code and transforms the code.

However, a compiler can only transform the code if the compiler is able to validate that parallel execution would yield the same result as the serial execution. In many cases, a programmer's choice of programming language construct adds unnecessary serial restrictions and results in loops that cannot be optimized.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
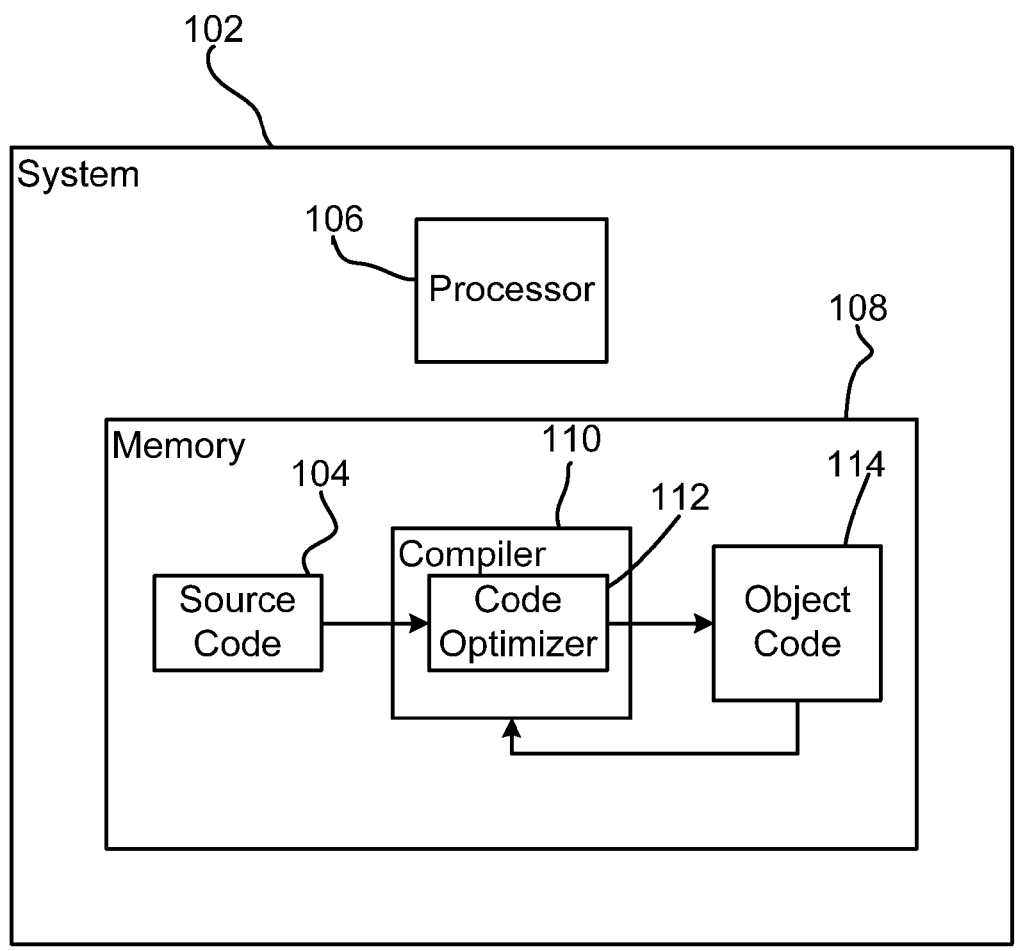
FIG. 1 is a computing system in accordance with the described embodiments.

Methods to improve optimization of compilation are presented. In one embodiment, a method includes identifying one or more optimization speculations with respect to a code region and speculatively performing transformation on an intermediate representation of the code region in accordance with an optimization speculation. The method includes generating an advice message corresponding to the optimization speculation and displaying the advice message if the optimization speculation results in an improved compilation result.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for optimization of compilation. The method and apparatus are primarily discussed in reference to multi-core processor computer systems. However, the methods and apparatus for optimization of compilation are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads.

Overview

Methods to improve optimization of compilation are presented. In one embodiment, a method includes identifying one or more optimization speculations with respect to a code region and speculatively performing transformation on an intermediate representation of the code region in accordance with an optimization speculation. The method includes generating an advice message corresponding to the optimization speculation and displaying the advice message if the optimization speculation results in an improved compilation result.

FIG. 1 is a computing system in accordance with the described embodiments. Many related components such as buses and peripherals have not been shown to avoid obscuring the invention. Referring to FIG. 1, computer system 102 comprises processor 106, memory 108, source code 104, compiler 110, code optimizer 112, and object code 114.

In one embodiment, computer system 102 is used by a programmer or software developer to create source code 104. In one embodiments, source code 104 comprises program statements in a high level computer language, including object oriented and other languages, e.g., FORTRAN, Java, C++, etc. Computer system 102 includes one or more processors 106 and memory 108 in which programs are loaded and executed by processor 106. Memory 108 includes compiler 110 to translate source code 104 into executable object code 114. Compiler 110 includes code optimizer 112 executed by processor 106.

In one embodiment, a developer invokes code optimizer 112 to optimize positioning and placement of the instructions in source code 104, including loops that perform iterations with respect to array indices, in the generated objected code 114 that is optimized with respect to, for example, multi-dimensional arrays. Object code 114 comprises binary executable code compiled from source code 104.

In one embodiment, code optimizer 112 is included in compiler 110 as shown in FIG. 1 or part of a separate module. Code optimizer 112 seeks to rearrange the order of nested loop execution, to vectorize a loop, and to parallelize a loop-nest.

In one embodiment, computer system 102 comprises a computer workstation, laptop, desktop, server, mainframe or any other computing device suitable for developing code 104. In one embodiment, processor 106 comprises one or more central processing units. Memory 108 comprises one or more memory devices into which programs are loaded.

Speculative Compilation

In one embodiment, a compiler (e.g., compiler 110) performs advice-mode compilation, speculative compilation, or both. The compilation process includes several phases, including phase I (speculation point), where the compiler determines whether there are any opportunities for speculative execution that is going to lead to better optimizations.

In one embodiment, a compiler performs optimization speculation using the intermediate representation of a code region. The compiler translates the optimization speculation into useful advice (e.g., an advice message) and attaches the advice message to the code region. Subsequently, the compiler continues to perform other compilation phases by making use of the optimization speculation (performed earlier). Note that the optimization speculation is applied before actual code modification by a programmer. In one embodiment, the compiler adds more new optimization speculations during the compilation process.

In one embodiment, a compiler reaches a phase where the compiler has performed a set of advanced optimizations. For each code region that is attached with advice messages, the compiler determines whether the code region has been optimized, for example, more transformations (e.g., vectorization, parallelization, etc.) are triggered. If yes, the compiler adopts the optimization speculation and displays the corresponding advice message to users. Otherwise, the compiler determines whether to perform backtrack to an earlier speculation point. The compiler returns to the earlier speculation point and proceeds with different optimization speculations.

In one embodiment, a compiler is operable to keep track of a code region (e.g., a particular loop-nest) on which speculative transformation has been performed. At the end of the compilation (or at an intermediate point after an optimization phase), for each code-region, a compiler determines whether any advanced optimizations have been performed. If so, the compiler displays/outputs advice messages attached to the code region. If not, the compiler determines whether the compiler is able to backtrack to an earlier speculation point. The compiler tries a different optimization speculation.

In one embodiment, examples of such advanced optimizations includes: parallelization of loop-nests, vectorization of loops, software-pipelining of loops, and memory-optimizations (e.g., loop-blocking and unroll jam on loop-nests).

In one embodiment, speculative compilation within a compiler provides selective advice to users to improve performance of the applications. The output from a compiler in advice-mode compilation includes a set of advice messages that users are able to follow to improve performance of their applications.

In one embodiment, a compiler workflow includes multiple phases. Each phase performs different analysis and transformations on the intermediate representation of user code. When the compiler performs advice-mode compilation, the compiler is operable to analyze and to perform a speculative transformation that has a high probability of leading to better optimizations.

In one embodiment, a compiler is operable to translate an optimization speculation into a "useful" advice message for the programmer. The advice message is expressed in terms of the source-code (using source variable names, line numbers, etc.). The advice message conveys to the programmer details on how to get the benefits of the "speculative" code-path.

In one embodiment, speculative compilation provides a high guarantee to a programmer that the benefit of optimizations will be realized once the advice messages related to each code region is applied. When there are multiple issues (that correspond to multiple advice messages) affecting a single code region, speculative compilation results in the generation of all advice messages in a single compilation. A programmer is able to do an entire analysis in a single step and decide which advice messages to apply.

In one embodiment, a compiler finds multiple ways (corresponding to different advice messages) of resolving an issue, for example, the use of restrict keywords on the pointer arguments on a function and the use of compiler arguments to enable loop-invariant code-motion. The former advice is of a routine-level scope (because the restrict keyword is applied to the pointer parameters of a routine) and the latter advice is of a compilation-level scope (because the option applies to entire compilation). In one embodiment, a compiler uses an advice-level to resolve such issues along with giving the programmer an option to suppress specific advice messages (based on message-identifiers).

In one embodiment, a compiler combines two or more advice messages that target the same source code region, for example, duplicate messages are avoided for the same loop-nest. The duplicate messages may arise from versioning of a loop by the compiler or when the same loop presents in multiple instances in the intermediate representation as a result of function in-lining.

In one embodiment, an advice-mode compiler allows users to specify regions of a file or routine(s) which are considered critical. Users may know this information based on their knowledge of the application or from a previous analysis based on a performance-analysis tool.

In one embodiment, upon encountering the first optimization opportunity, a compiler enters the speculative mode described above, and continues to analyze the subsequent loop. In the speculative mode, the compiler verifies that if the programmer applies appropriate code modification, the optimization will in fact become possible. Only then will the compiler provides the advice message to the programmer.

Advice Message

In one embodiment, there are different types of optimization speculations. For example, an advice message (associated with an optimization speculation and the code region) is a suggestion: to use a local-variable for the upper-bound of a loop (instead of a class member), to initialize a local variable unconditionally at the top of the loop-body, or to add restrict keyword to pointer-arguments of a function definition.

In one embodiment, an advice message suggests to apply a new pragma on a certain loop-level if the pragma semantics is satisfied (as verified by the programmer). In one embodiment, an advice message suggests to add new command-line compiler options that assert new properties (e.g.,: -Qansi-alias, or -Qno-alias-args).

In one embodiment, an advice message is specific with respect to a user code region so that the programmer either applies or rejects the advice message after doing some analysis of the code/program. A compiler describes what assertions the users make when they apply the advice messages. The advice message guides the users on how to determine whether a proposed modification is or is not correct in the specific code section (e.g., a code region) being examined.

In one embodiment, a compiler prefers a localized optimization speculation to a compiler-level optimization. The compiler gives suggestion to a programmer about a source code change that affects a single loop as opposed to adding/removing a compiler-option that has a much wider impact.

Examples of advanced optimization speculation, for example, which result in parallelization and vectorization of loop-nests, include the following examples of advice messages.

In one embodiment, an advice message is a suggestion to add a new compiler option that asserts new properties. Examples of such compiler options include "Qansi-alias" and "Qno-alias-args" for C programs. "Qansi-alias" is an assertion by a programmer that the application code follows ANSI semantics. "Qno-alias-args" is an assertion by a programmer that there is no aliasing issue between pointers that are input arguments to a function. In both cases, the speculation point is an early phase that performs partial redundancy elimination (PRE) that moves loop-invariant computations outside of a loop. In one embodiment, a PRE phase executes before the doloop-recognition and loop-optimization transformations, such as, for example, parallelization and vectorization of loop-nests. In the advice-mode compilation, a compiler tries to find opportunities to do additional loop-invariant code-motion on particular loop-nests using the extra properties from these options speculatively. If it is successful, a compiler captures the optimization speculation in an advice message (attached to the loop-nest) and performs the loop-invariant code motion so that later transformations benefit from this code-motion.

In one embodiment, an advice message is a suggestion to move a function-call that leads to an early return (from the current function) to outside the loop. For example, a code that checks for some error condition (using a function call) inside a loop and returns early based on the error condition. In one embodiment, a loop-optimization (e.g., parallelization and vectorization) might be disabled if there is an "early return" from the loop. The speculation point for such construct is the early PRE phase. In one embodiment, a compiler determines whether to move the function-call and the "early return" to outside the loop. This optimization speculation is captured in an advice message that is attached to the loop. The compiler proceeds by performing the moving operation followed by marking the loop as a counted doloop in a speculative-mode which enables advanced optimizations of the loop later. There are several phases that perform scalar optimizations, such as, for example, constant-propagation and copy-propagation that run before the loop-optimizations. The speculative function-hoisting may enable more constant propagations that typically lead to better loop optimizations.

In one embodiment, an advice message is a suggestion to use a local variable as the upper-bound of a loop. The speculation point is the phase that performs doloop-recognition inside the compiler. This is the phase that a compiler classifies loops as having a fixed trip-count (at point of entry) or not. A compiler assumes that upper-bound will change during the execution of the loop. When such a case is encountered, the compiler speculatively moves the upper-bound computation outside the loop. The compiler assumes that the upper bound does not change during the execution of the loop. This optimization speculation is captured in an advice message that is attached to the loop. The compiler proceeds by marking the loop as a counted doloop in a speculative-mode which enables advanced optimizations of the loop later.

In one embodiment, an advice message is a suggestion to use of a specific pragma for a loop-nest. One example of a speculation point for this is the loop-parallelization phase inside a compiler. In order to successfully parallelize a loop-nest, a compiler has to be certain that there are no loop-carried data-dependences for memory accesses inside the loop that is a candidate for being parallelized. If the compiler is not able to ascertain whether such a loop-carried dependence exists between two memory accesses, a compiler (in a normal mode) will abort performing the parallelization for this loop. Contrastingly, in the advice-mode, a compiler speculatively applies a "#pragma parallel" directive for the loop and proceeds further. At the same time, the compiler captures the details of the memory-references that had the dependence issues as part of the advice message for users. In one embodiment, an advice message suggests that this directive with additional clauses ("#pragma parallel private (W)") can resolve the dependence issues inside the compiler and lets the compilation to proceed further. Another example of this optimization speculation is in a loop-vectorization phase when a compiler checks for (the non-existence) of certain kinds of loop-carried dependences between memory-references inside the loop. The advice message uses a "#pragma ivdep" directive with details of the specific memory references involved.

In one embodiment, an advice message is a suggestion to mark a routine as elemental/const or concurrency-safe. This applies when the parallelization of a loop is prevented by a call to a user routine. If a programmer knows that the routine does not cause side effects and that its results are always deterministic (i.e., the return value depends exclusively on the input arguments, and not on any global state), then the programmer can mark the routine as "elemental" (Fortran) or "const" (C/C++) to inform the compiler that such calls do not affect parallelization. Furthermore, routines with side effects that a programmer wants to allow concurrent execution (e.g., printing messages to stderr) may be marked as concurrency-safe to enable advanced optimizations.

Examples

Two examples of speculative optimization and generation of advice messages are presented below. The first code example is presented in Table 1 and an example of advice messages generated with respect to the code is presented in Table 2.

TABLE 1

Code example 1

```
extern int num_nodes;
typedef struct TEST_STRUCT {
        // Coordinates of city1
        float latitude1;
        float longitude1;
        int city_id1;
        // Coordinates of city2
        float latitude2;
        float longitude2;
        int city_id2;
} test_struct;
extern float *distances;
extern test_struct** nodes;
void process_nodes(void)
{
    float const R = 3964.0;
    float lat1, lat2, long1, long2, result;
    for (int k=0; k < num_nodes; k++) { // LINE 29
        lat1 = nodes[k]->latitude1;
        lat2 = nodes[k]->latitude2;
        long1 =nodes[k]->longitude1;
        long2 = nodes[k]->longitude2;
        // Compute the distance between the two cities
        temp = sin(lat1) * sin(lat2) + cos(lat1) * cos(lat2) *
cos(long1–long2);
        result = 2.0 * R * atan(sqrt((1.0–temp)/(1.0+temp)));
        // Store the distance computed in the distances array
        distances[k] = result;
    }
}
```

In one embodiment, when the code is compiled with the advice-mode, a compiler generates three advice messages with respect to the loop-nest (referring to LINE 29):

TABLE 2

Example of advice messages with respect to code example 1

1) Add –Qansi-alias option for better type-based disambiguation analysis by the compiler if appropriate (option will apply for entire compilation). [VERIFY] Make sure that the semantics of this option is obeyed for entire compilation.
2) Use "#pragma parallel" to parallelize the loop at line 29, if these arrays in the loop do not have cross-iteration dependencies: nodes, distances. [VERIFY] A cross-iteration dependency exists if a memory location is modified in an iteration of the loop and accessed (a read or a write) in another iteration of the loop. Make sure that there are no such dependencies.
3) If the trip count of the loop at line 29 is greater than 16, then use "#pragma loop count min(16)" to parallelize this loop. [VERIFY] Make sure that the loop has a minimum of 16 iterations.

As demonstrated in the above example, advice messages related to parallelization of the single loop are generated. In one embodiment, a compiler is able to proceed speculatively to resolve each problem that the compiler encounters such that end-result is full parallelization of the loop.

The second code example is presented in Table 3 and an example of advice messages generated with respect to the code is presented in Table 4.

TABLE 3

Code example 2

```
#define __M1_CONST 34
#define __N1_CONST 69
#define U1_CONST 0xffffffe0
#define L1_CONST 0x1f
#define vector_a 0x9908b0df
unsigned int r[1000][1000];
int global_m;
bool check_error_condition(int n);
int foo(int n)
{
    int i,j;
    unsigned int y;
#define __VSL_MT2203_STATEUPDATE(r1,r2,r3,res) \
            y =(r1 & U1_CONST)|(r2 & L1_CONST); \
            res = r3^(y>>1)^((0 – ( y & 0x1 )) & vector_a);
    for (j = __N1_CONST; j < n; j++) { //LINE 22
        global_m = __M1_CONST;
        if (check_error_condition(n)) { //LINES 25-26
            return –1;
        }
        for (i = __N1_CONST; i < n; i++) {
            __VSL_MT2203_STATEUPDATE( r[j][i –
                __N1_CONST], r[j][i + (1 –__N1_CONST)],
                r[j][i + (global_m – __N1_CONST)], r[j][i])
        }
    }
    return 0;
}
```

In one embodiment, when the code is compiled with an advice-mode, a compiler generates two advice messages with respect to the loop-nest (referring to LINE 25):

1) Moving the block of code that consists of a function-call (line 25), if-condition (line 25), and an early return (line 26) to outside the loop may enable parallelization of the loop at line 22. [VERIFY] Make sure that the function-call does not rely on any computation inside the loop and that restructuring the code as suggested above retains the original program semantics.
2) If the trip count of the loop at line 25 is greater than 8, then use "#pragma loop count min(8)" to parallelize this loop. [VERIFY] Make sure that the loop has a minimum of 8 iterations.

Table 4 Example of advise messages with respect to code example 2

As demonstrated in this example, advice messages related to parallelization of the outer loop are generated. In one embodiment, a compiler is able to proceed speculatively to resolve each problem the compiler encounters. The end-result is parallelization of the outer loop and vectorization of the inner loop. The copy propagation of global_m results in successful vectorization of the inner loop. Without the speculative compilation, the inner-loop will have dependence issues for vectorization.

Figure 2:
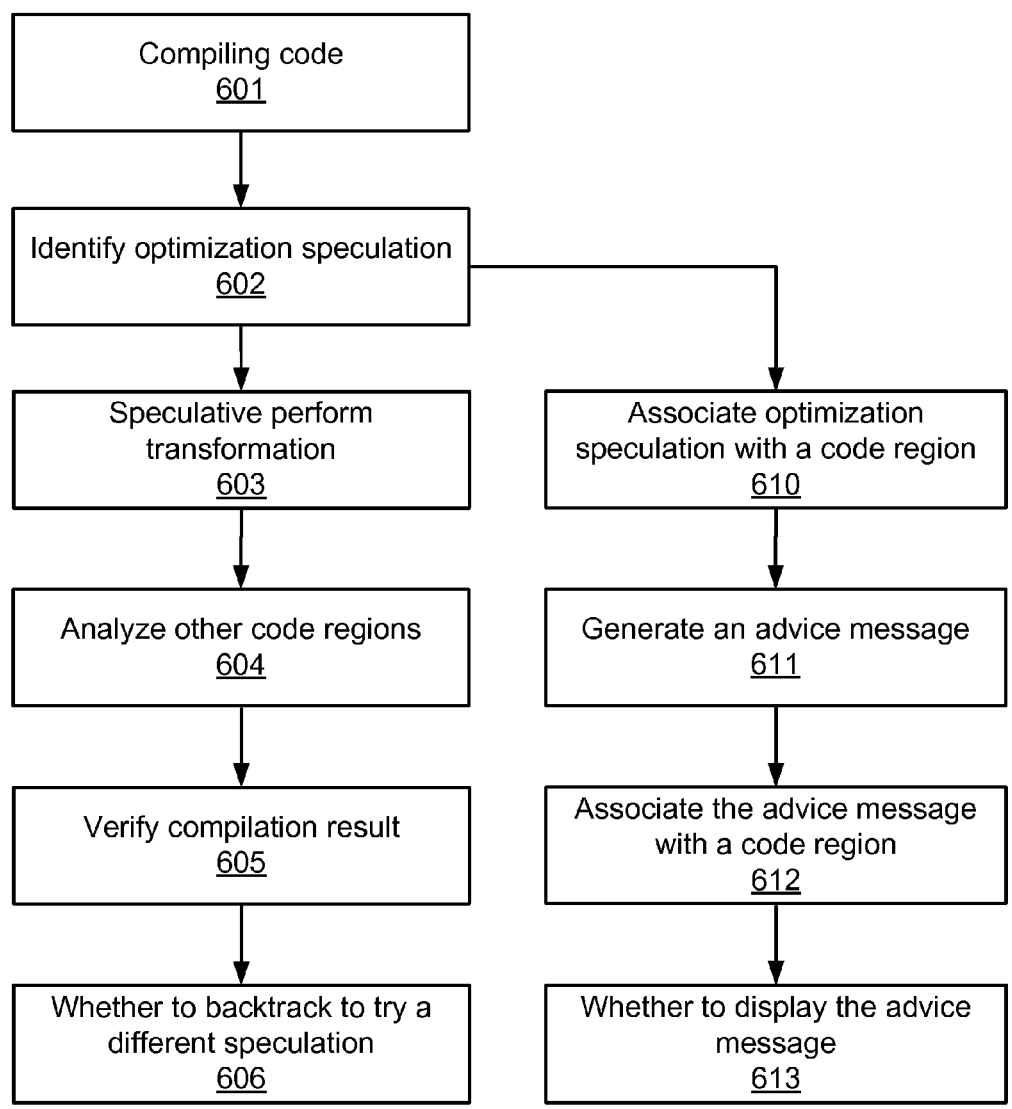
FIG. 2 is a flow diagram of one embodiment of a process to perform speculative compilation.

FIG. 2 is a flow diagram of one embodiment of a process to perform speculative compilation. The process is performed by processing logic that may comprise hardware (circuitry, dedicated logic, etc.), software (such as one that is run on a general purpose computer system or a dedicated machine), or a combination of both. In one embodiment, the process is performed in conjunction with a compiler (e.g., compiler 110 with respect to FIG. 1). In one embodiment, the process is performed by a computer system with respect to FIG. 4.

Referring to FIG. 2, in one embodiment, processing logic begins by compiling code (process block 601). A code is divided into code regions (code sections). A code region may include other code regions and may be nested within other code regions.

In one embodiment, processing logic identifies one or more optimization speculations with respect to a code region when compiling the code (process block 602). An optimization speculation may result in parallelization of a loop-nest and vectorization of a loop. In one embodiment, processing logic speculatively performs transformation on an intermediate representation of the code region in accordance with an optimization speculation (process block 603). The transformation is speculatively performed prior to modification on the code region.

In one embodiment, processing logic analyzes other code regions (process block 604). Processing logic compiles and analyzes other code regions related to the code region using the transformed intermediate representation. In one embodiment, the code region is a loop nested within another larger code region.

In one embodiment, processing logic determines whether to adopt the speculation optimization based on compilation result after the transformation, for example, whether a compilation with the other code regions is successful in conjunction with the optimization speculation (process block 605). Processing logic determines whether to accept the optimization speculation.

In one embodiment, processing logic associates one or more optimization speculations with the code region (process block 610). In one embodiment, processing logic generates an advice message corresponding to the optimization speculation (process block 611). In one embodiment, processing logic associates the advice message with the code region (process block 612).

In one embodiment, processing logic determines whether to display the advice message to users (process block 613). Processing logic causes to display the advice message if the corresponding optimization speculation has been adopted, verified, or accepted. The advice message contains information specific about the code region. In one embodiment, processing logic combines two or more advice messages related to the code region. Processing logic prioritizes among several optimization speculations based on the localization scope of each optimization speculation.

In one embodiment, processing logic determines whether to backtrack to apply a different optimization speculation if the optimization is not accepted (process block 606).

In one embodiment, processing logic provides an option whether to enable the advice-mode compilation. In one embodiment, processing logic determines whether to enable the advice-mode compilation by referring to a saving profile, an operating system, a user configuration setting, or combinations thereof.

In one embodiment, an advice message is, for example, a suggestion to use a local variable as an upper-bound of a loop, to use of a pragma for a loop-nest, to mark a routine as elemental or concurrency-safe, to move a function call to outside a loop if the function call leads to an early return, or to use a compiler option to assert new properties.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 3:
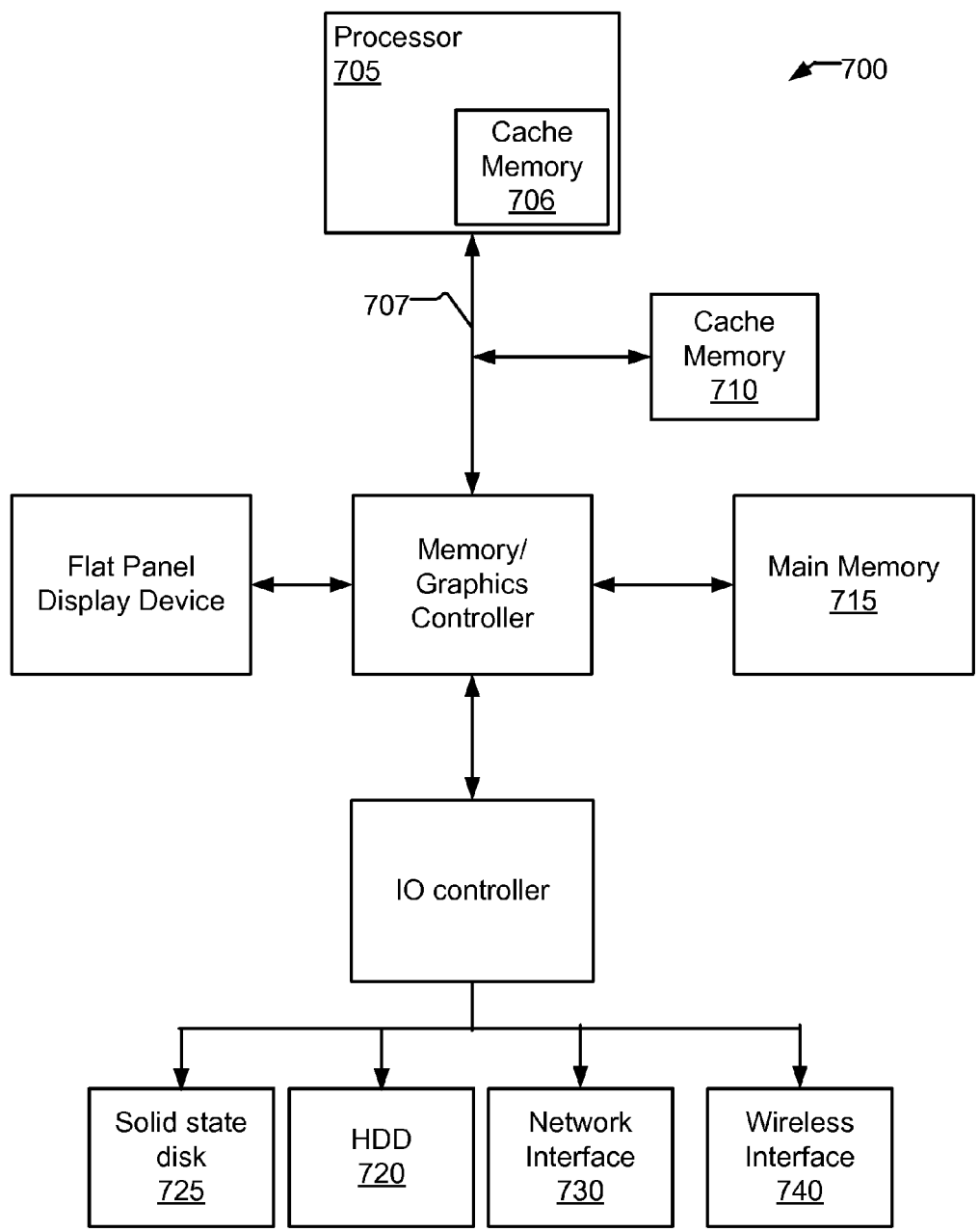
FIG. 3 illustrates a computer system for use with one embodiment of the present invention.

FIG. 3, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 3. Furthermore, other embodiments of the invention may be distributed throughout several circuits, logic units, or devices illustrated in FIG. 3.

Figure 4:
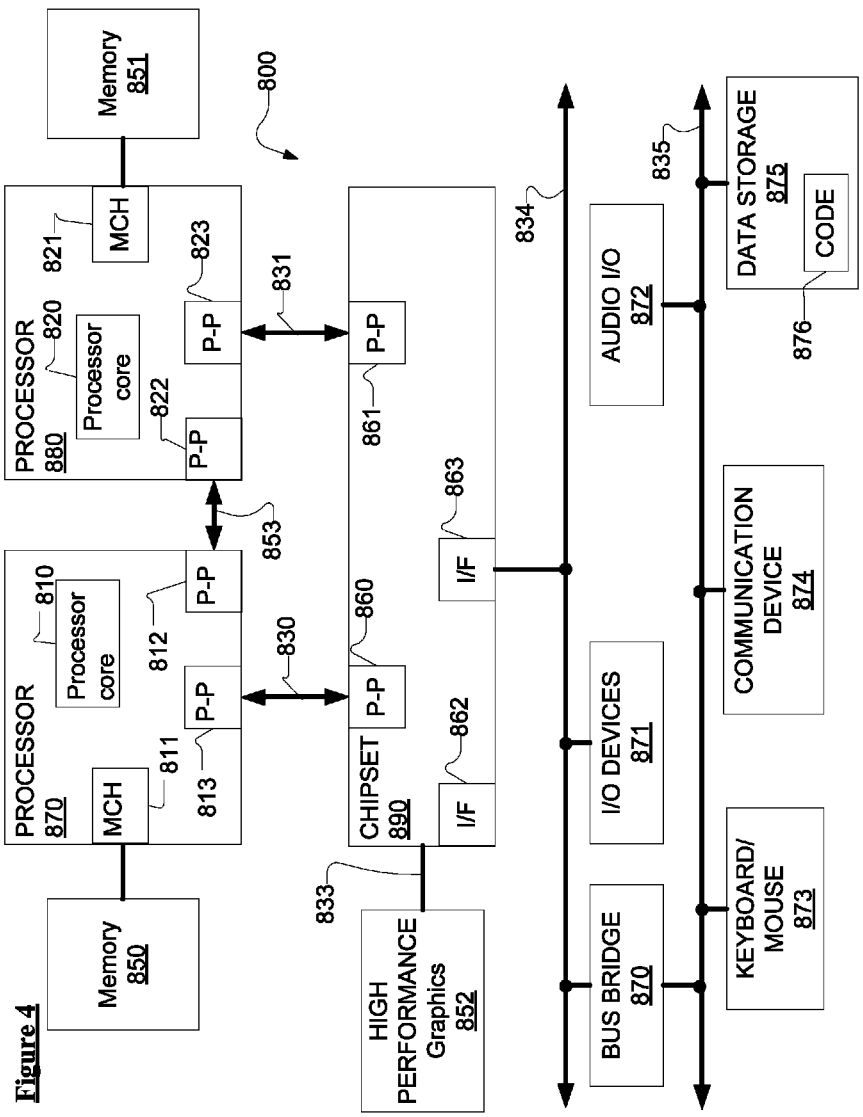
FIG. 4 illustrates a point-to-point computer system for use with one embodiment of the invention.

Similarly, at least one embodiment may be implemented within a point-to-point computer system. FIG. 4, for example, illustrates a computer system that is arranged in a point-to-point (PtP) configuration. In particular, FIG. 4 shows a system where processors, memory, and input/output devices are interconnected by a number of point-to-point interfaces.

The system of FIG. 4 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or within data storage 875, or within memory 850 of FIG. 4.

Other embodiments of the invention, however, may exist in other circuits, logic units, or devices within the system of FIG. 4. Furthermore, other embodiments of the invention may be distributed throughout several circuits, logic units, or devices illustrated in FIG. 4.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

What is claimed is:

1. A method comprising:

performing by a compiler a first speculation point phase of compiling code to obtain an intermediate representation of the compiling code, wherein the compiler determines whether there are any opportunities for speculative execution;

identifying a first code region of the intermediate representation of the compiling code;

identifying a plurality optimization speculation with respect to the same code of the first code region;

speculatively performing a transformation in accordance with a first optimization speculation, on the first code region wherein performing the transformation is speculatively performed prior to a modification of the first code region;

generating an advice message by the compiler, the advice message corresponding to the first optimization speculation based on the transformation, the advice message being associated with the first code region and expressed in terms of source variable names and source line numbers;

performing by the compiler a plurality of the other code compilation phases using the transformation and speculatively performing additional transformations with the other code compilation phases in accordance with the plurality of optimization speculations and generating additional advice message corresponding to each additional transformation being associated with the first code region and expressed in terms of the source variable names and the source line number;

displaying advice messages being associated with the first code region to a user, the user being able to decide which of the advice messages to apply;

determining whether to accept the first optimization speculation based on the advice message; and if the first optimization speculation is not accepted, backtracking to an earlier speculation point.

2. The method of claim 1, wherein the one or more optimization speculations result in parallelization of a loop-nest and vectorization of a loop.

3. The method of claim 1, further comprising verifying whether to adopt the speculation optimization based at least on a compilation result after the transformation.

4. The method of claim 1, further comprising compiling a second code region in conjunction with a transformed intermediate representation of the first code region, wherein the second code region is related to the first code region.

5. The method of claim 4, wherein the first code region is a loop nested within the second code region.

6. An article of manufacture comprising a non-transitory computer readable medium including data storing instructions thereon that, when accessed by a machine, cause the machine to perform a method comprising:

performing by a compiler a first speculation point phase of compiling code to obtain an intermediate representation of the compiling code, wherein the compiler determines whether there are any opportunities for speculative execution;

identifying a first code region of the intermediate representation of the compiling code;

identifying a plurality optimization speculation with respect to the same code of the first code region;

speculatively performing a transformation in accordance with a first optimization speculation, on the first code region wherein performing the transformation is speculatively performed prior to a modification of the first code region;

generating an advice message by the compiler, the advice message corresponding to the first optimization speculation based on the transformation, the advice message being associated with the first code region and expressed in terms of source variable names and source line numbers;

performing by the compiler a plurality of the other code compilation phases using the transformation and speculatively performing additional transformations with the other code compilation phases in accordance with the plurality of optimization speculations and generating additional advice message corresponding to each additional transformation being associated with the first code region and expressed in terms of the source variable names and the source line number;

displaying advice messages being associated with the first code region to a user, the user being able to decide which of the advice messages to apply;

determining whether to accept the first optimization speculation based on the advice message; and if the first optimization speculation is not accepted, backtracking to an earlier speculation point.

7. The method of claim 6, further comprising:

determining whether to backtrack to apply a second optimization speculation if the first optimization is not accepted;

speculatively performing a second transformation in accordance with the second optimization speculation, on the first code region;

determining whether to accept the second optimization speculation; and generating an advice message corresponding to the second optimization speculation based on the transformation if the second optimization speculation is accepted.

8. The method of claim 6, further comprising:

combining two or more advice messages related to the first code region; and displaying one advice message associated with the first code region.

9. The method of claim 6, further comprising prioritizing among the one or more optimization speculations based at least on a localization scope of each of the optimization speculations.

10. The method of claim 6, further comprising providing users with an option to enable an advice-mode compilation.

11. The method of claim 6, wherein the first advice message is a suggestion to move a function call to outside a loop if the function call leads to an early return.

12. The method of claim 6, wherein the first advice message is a suggestion to use a local variable as an upper-bound of a loop.

13. The method of claim 6, wherein the first advice message is a suggestion for the use of a pragma for a loop-nest.

14. The method of claim 6, wherein the first advice message is a recommendation to mark a routine as elemental or concurrency-safe.

15. The method of claim 6, wherein the first advice message is a suggestion to use a compiler option to assert new properties.

16. An article of manufacture comprising a non-transitory computer readable medium including data storing instructions thereon that, when accessed by a machine, cause the machine to perform a method comprising:
- performing by a compiler a first speculation point phase of compiling code to obtain an intermediate representation of the compiling code, wherein the compiler determines whether there are any opportunities for speculative execution;
- identifying a first code region of the intermediate representation of the compiling code;
- identifying a plurality of optimization speculations with respect to the same code of the first code region;
- speculatively performing a transformation in accordance with a first optimization speculation, on the first code region;
- determining whether to accept the first optimization speculation;
- generating an advice message by the compiler, the advice message corresponding to the first optimization speculation based on the transformation only if the first optimization speculation is accepted, the advice message being associated with the first code region and expressed in terms of source variable names and source line numbers;
- performing by a compiler a plurality of other code compilation phases using the transformation and speculatively performing additional transformations with the other code compilation phases and generating additional advice messages corresponding to each additional transformation; and
- displaying the advice messages to a user, the user being able to decide which advice messages to apply.

17. The article of claim 16, wherein the method further comprises:
- determining whether to backtrack to apply a second optimization speculation if the first optimization is not accepted;
- speculatively performing a second transformation in accordance with the second optimization speculation, on the first code region;
- determining whether to accept the second optimization speculation;
- generating an advice message corresponding to the second optimization speculation based on the transformation if the second optimization speculation is accepted.

18. A system to compile code, comprising:
memory to store compiler code; and
a processor coupled to the memory to execute the compiler code, wherein the compiler code, when executed, is to perform operations comprising:
- performing by a compiler a first speculation point phase of compiling code to obtain an intermediate representation of the compiling code, wherein the compiler determines whether there are any opportunities for speculative execution;
- identifying a first code region of the intermediate representation of the compiling code;
- identifying a plurality optimization speculation with respect to the same code of the first code region;
- speculatively performing a transformation in accordance with a first optimization speculation, on the first code region wherein performing the transformation is speculatively performed prior to a modification of the first code region;
- generating an advice message by the compiler, the advice message corresponding to the first optimization speculation based on the transformation, the advice message being associated with the first code region and expressed in terms of source variable names and source line numbers;
- performing by the compiler a plurality of the other code compilation phases using the transformation and speculatively performing additional transformations with the other code compilation phases in accordance with the plurality of optimization speculations and generating additional advice message corresponding to each additional transformation being associated with the first code region and expressed in terms of the source variable names and the source line number;
- displaying advice messages being associated with the first code region to a user, the user being able to decide which of the advice messages to apply;
- determining whether to accept the first optimization speculation based on the advice message; and
- if the first optimization speculation is not accepted, backtracking to an earlier speculation point.

19. The system of claim 18, the operations further comprising:
- determining whether to backtrack to apply a second optimization speculation if the first optimization is not accepted;
- speculatively performing a second transformation in accordance with the second optimization speculation, on the first code region;
- determining whether to accept the second optimization speculation; and
- generating an advice message corresponding to the second optimization speculation based on the transformation if the second optimization speculation is accepted.

* * * * *